INVENTOR
WILLIAM R. POSTLEWAITE
BY Charles J. Gibeau
Ralph L. Freeland Jr.
ATTORNEYS April 27, 1965    W. R. POSTLEWAITE    3,180,498
TUBE BUNDLE EXTRACTOR FOR HEAT EXCHANGERS
Filed Oct. 2, 1961    7 Sheets-Sheet 2
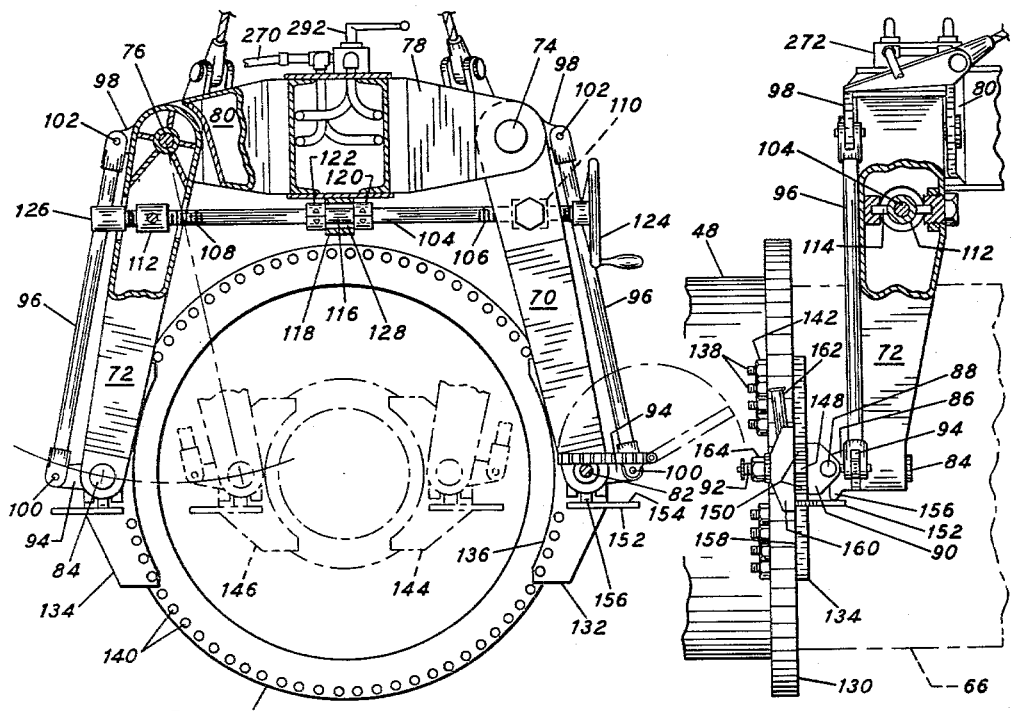
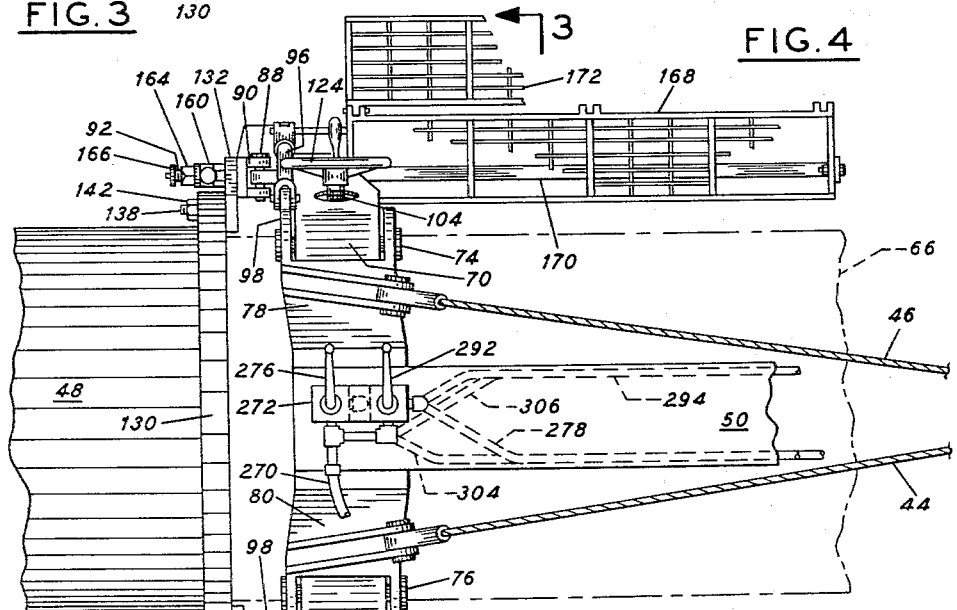
INVENTOR
WILLIAM R. POSTLEWAITE
BY
ATTORNEYS

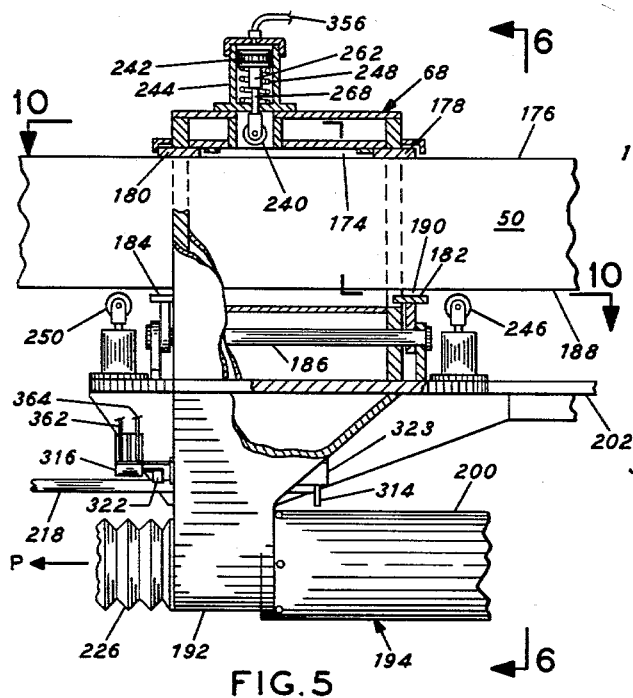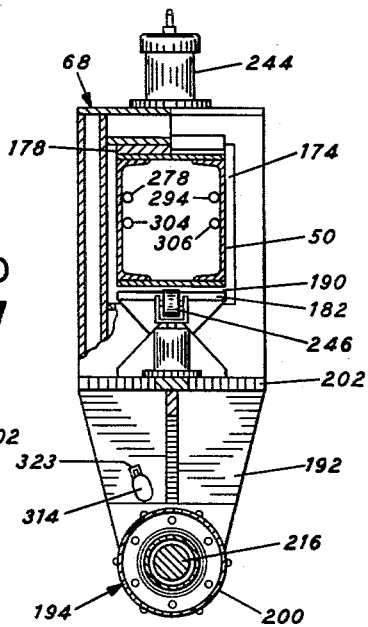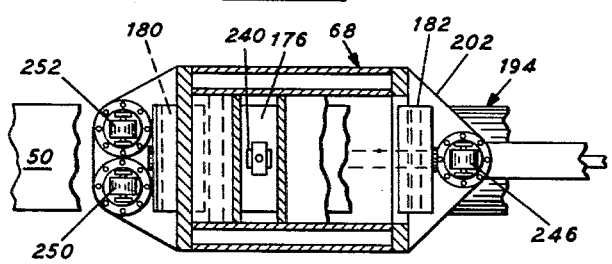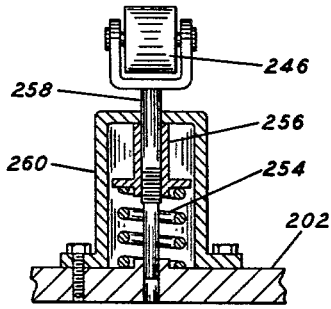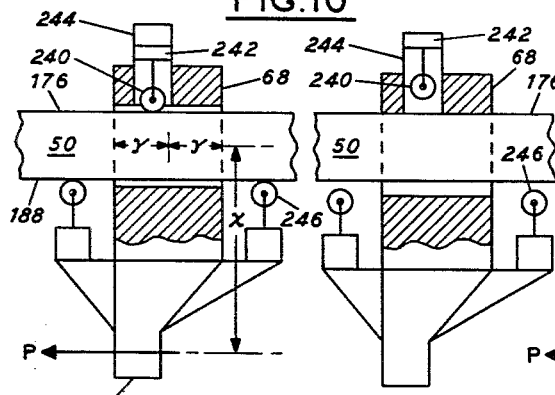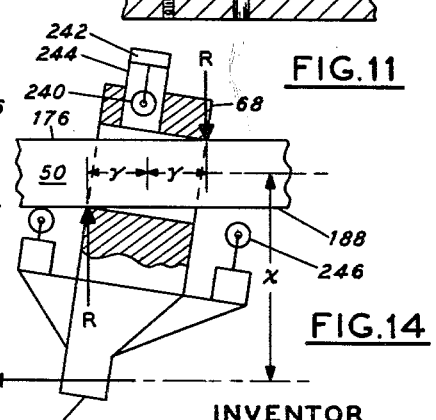

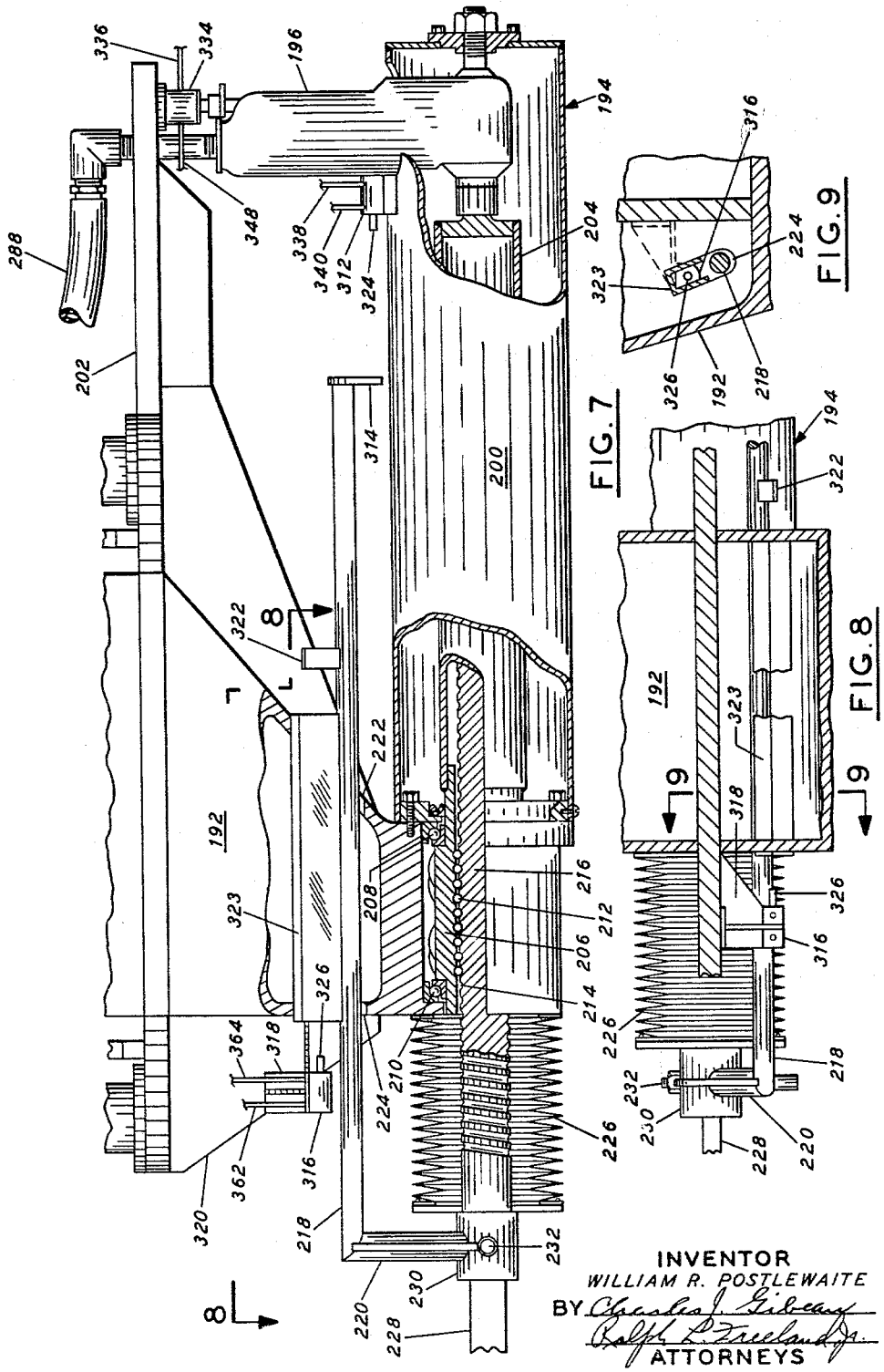

April 27, 1965   W. R. POSTLEWAITE   3,180,498
TUBE BUNDLE EXTRACTOR FOR HEAT EXCHANGERS
Filed Oct. 2, 1961   7 Sheets-Sheet 5

INVENTOR
WILLIAM R. POSTLEWAITE
BY
ATTORNEYS

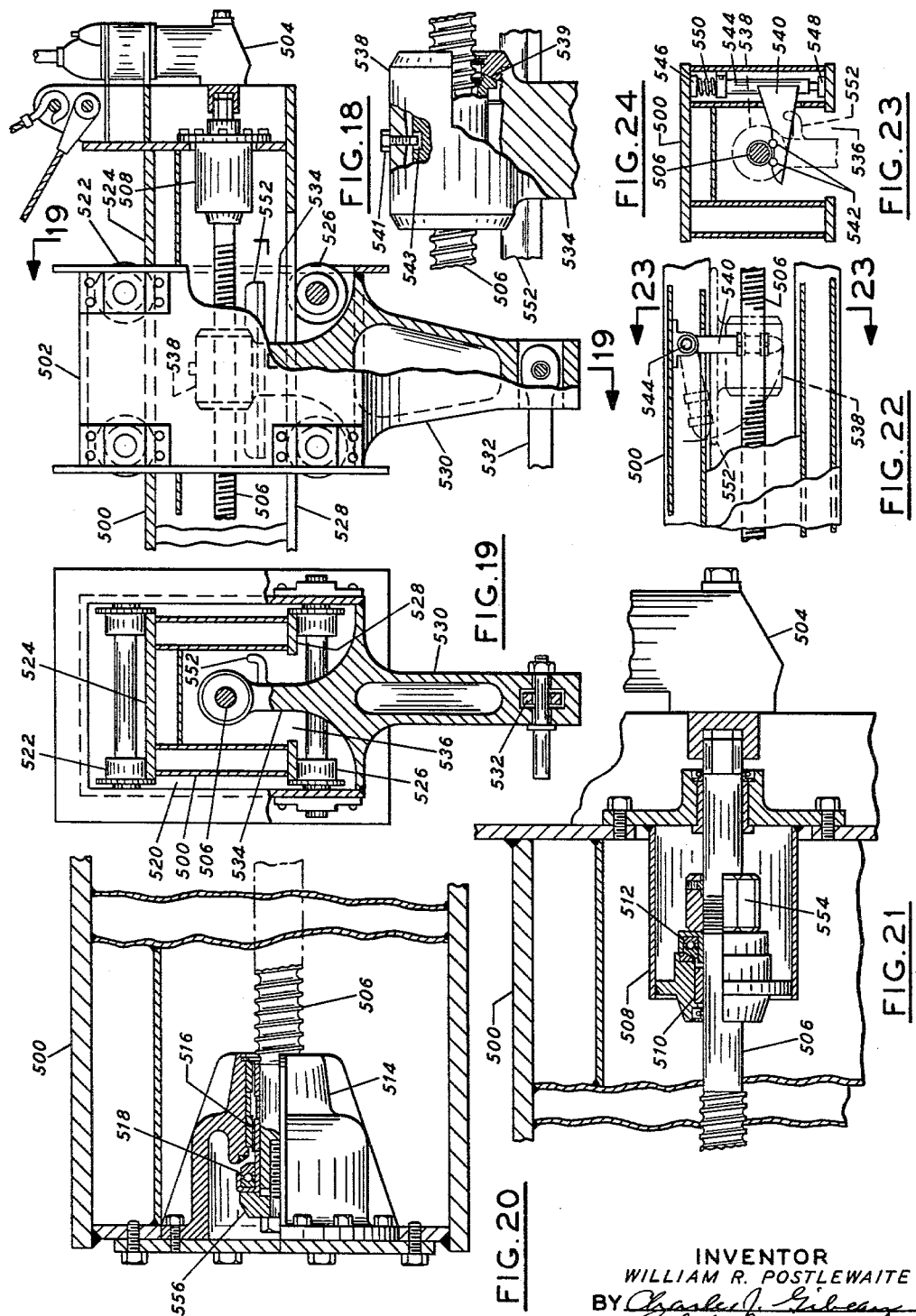

United States Patent Office 3,180,498
Patented Apr. 27, 1965

3,180,498
TUBE BUNDLE EXTRACTOR FOR HEAT
EXCHANGERS
William R. Postlewaite, Menlo Park, Calif., assignor to
California Research Corporation, San Francisco, Calif.,
a corporation of Delaware
Filed Oct. 2, 1961, Ser. No. 142,056
13 Claims. (Cl. 214—1)

This invention relates to apparatus for extracting a separable tube bundle from the shell of a heat exchanger and for inserting a tube bundle within its shell. More particularly, the invention is directed to a compact portable apparatus which can be transported by a mobile crane for connection to heat exchangers placed at various elevations throughout a processing installation, and which can be operated through self-contained controls by an operator stationed on the tube bundle extractor to accomplish the extraction or insertion of the tube bundle in a manner to prevent physical damage to it.

Heat exchangers of the type of particular interest to the present invention are constructed with a horizontal cylindrical shell which encases a plurality of tubes which are supported within the shell by and between tube sheets. The outermost tube sheet may be secured to an end flange on the shell while the remaining tube sheets are not attached to the shell but float to accommodate the changing dimensions of the tube bundle and the shell which occur with changes in temperature of the fluids to which these elements are exposed. The tubes are connected to receive a stream of process fluid and exchange the heat from the stream with another stream of cooling or heating fluid flowing through the shell. In many processes, such as an oil refinery, for example, the tubes after a period of time have deposits built up in or upon them which affect the heat transferring function of the heat exchanger. Periodically, therefore, the tube bundle must be removed from the heat exchanger, cleaned and replaced within its shell to maintain the processing apparatus in proper working condition.

The individual tubes of the tube bundle are of relatively small diameter and the tube bundle, because of its length, is usually quite flexible. However, because of the multiplicity of tubes used in the tube bundle, it may weigh up to 14 or more tons. Therefore, when working with a tube bundle, care must be taken to give it proper support along its length to prevent injury to the individual tubes and to prevent damaging the fluid-tight connection between the tubes and the two end tube sheets.

It has been the practice in many processing installations to provide permanent auxiliary steel frameworks as an adjunct to the supporting structure for the heat exchangers to facilitate the servicing of the tube bundles. Such frameworks, although costly to install and used only periodically, were found necessary to provide proper support for the tube bundle when it was withdrawn from its shell for servicing. Even with such a framework and with the block and tackle devices used with it to extract and support the tube bundle, the servicing procedure normally required five to nine men and was time-consuming and costly. The apparatus of the present invention has been devised to permit the servicing operation to be accomplished in less time and with less manpower than previously was required and without the need for the auxiliary framework and associated equipment used heretofore.

Pursuant to the present invention, the tube bundle extractor comprises a compact assemblage which includes a beam which can be detachably connected at one end to the shell of the heat exchanger. The beam supports a movable carriage which is connected to the separable tube bundle and through which force can be exerted upon the tube bundle to extract it from or insert it into its shell. The beam also functions as a trolley beam for sling carriers which are movable along it to engage and support the flexible tube bundle when it is extracted from its shell. The connection between the tube bundle extractor and the shell of the heat exchanger is adjustable to permit the extractor to be connected to shells of various external diameters and the connection, although rigid in a horizontal plane, permits the tube bundle extractor to pivot in a vertical plane to compensate for the sag of the tube bundle as it is being inserted into its shell.

The principal object of this invention is to provide an improved apparatus for extracting a separable tube bundle from or inserting it into the shell of the exchanger.

Another object of this invention is to provide an improved connecting means for connecting a portable tube bundle extractor to the shell of the heat exchanger.

A further object of this invention is to provide a compact self-contained portable tube bundle extractor which can be maneuvered expeditiously into engagement with the shell of any one of several heat exchangers of various diameters placed at respective various elevations above the ground and which can be operated by a single operator to detachably connect the tube bundle extractor to the shell and extract the tube bundle therefrom.

Other objects of this invention will become apparent as the description of it proceeds in conjunction with the accompanying drawings in which:

FIG. 2 is a plan view of an end portion of the tube bundle extractor and the complementary end portion of the shell of the heat exchanger to which it is connected and particularly shows the arrangement of the connector apparatus.

FIG. 3 is an elevational view partly in section of the apparatus connecting the tube bundle extractor to the shell of the heat exchanger as viewed from the line 3—3 of FIG. 2.

FIG. 4 is a side elevation partly in section of the connector apparatus and the associated end of a heat exchanger shell as viewed from the line 4—4 of FIG. 2.

FIG. 5 illustrates in side elevation and partly in section a form of carriage which supports the force-exerting mechanism employed with this embodiment of the invention.

FIG. 6 illustrates in end elevation and partly in section a view of the carriage arrangement taken along the line 6—6 of FIG. 5.

FIG. 7 illustrates in side elevation and partly in section, details of the force-exerting mechanism employed with this embodiment of the invention.

FIG. 8 is a plan view of a portion of the force-exerting mechanism taken along the line 8—8 of FIG. 7.

FIG. 9 illustrates a detail of the structure taken along the line 9—9 of FIG. 8.

FIG. 10 illustrates a view of the carriage ararngement taken along the line 10—10 of FIG. 5.

FIG. 11 is an elevational view partly in section of a detail of the carriage arrangement.

FIGS. 12, 13 and 14 are schematic illustrations of an operation of the carriage arrangement when extracting a tube bundle.

FIGS. 18 to 24 inclusive illustrate details, partly in section, of a force-exerting arrangement employed in a modification of a tube bundle extractor made in accordance with the present invention.

Figure 1:
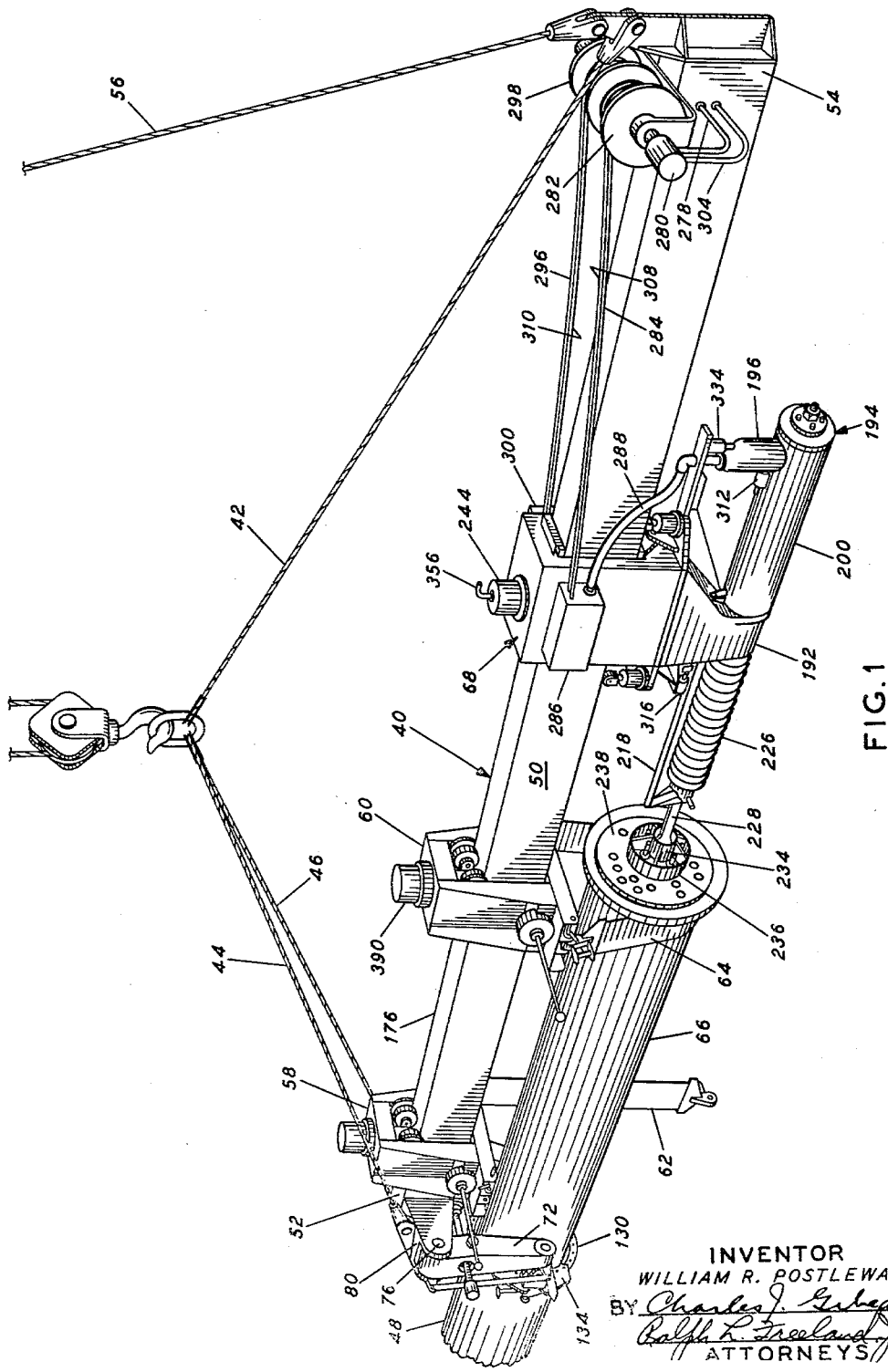
FIG. 1 is a perspective view in elevation of a preferred embodiment of the present invention and shows the tube bundle extractor connected to the shell of the heat exchanger and with the tube bundle partly extracted from its shell.

In the embodiment of the invention illustrated in FIG. 1 of the drawings, a tube bundle extractor 40 is supported by lines 42, 44, and 46 from the hook of a mobile crane not shown at the elevation of the shell 48 of a heat exchanger, to which shell it is connected. The tube bundle extractor has an elongated frame, the principal member of which is a single beam 50. The connector apparatus by which the tube bundle extractor is connected to the shell of the heat exchanger and which will be described in more detail hereinafter, is mounted at one end 52 of the beam, which end shall be called the inboard end. The free or outer end 54 of the beam, which shall be called the outboard end, is stabilized by a line 56, which is rigged to the mobile crane, separately from the crane hook and which can be adjusted to maintain the frame of the tube bundle extractor in parallel alignment with the longitudinal axis of the shell 48 prior to connecting and after disconnecting the extractor and the shell.

The beam 50 supports trolley carriages 58 and 60 to which respective band slings 62 and 64 are connected, which slings are used to support the weight of the tube bundle 66 when it is extracted from its shell. The beam supports also a carriage 68 which is selectively movable along the beam, and which is a part of the mechanism for exerting a force between the relatively stationary beam 50 and the tube bundle 66 for extracting the latter from its shell and for inserting it into its shell. This structure forms a compact assemblage which can be maneuvered more readily and with less powerful lifting equipment into and out of engagement with the shell of the heat exchanger than can self-contained tube bundle extractors used heretofore.

Referring now to FIGS. 2, 3 and 4, the connector apparatus for the tube bundle extractor comprises a pair of arms 70 and 72 which are mounted to swing in a common vertical plane about respective pins 74 and 76. The pins are mounted respectively in transverse members 78 and 80 which extend laterally from and are rigidly affixed to the inboard end 52 of the beam 50. The arms 70 and 72 are similar in construction and dimension and the pins 74 and 76 are placed equal distances on each side of the longitudinal axis of the beam 50. The arms are mounted to swing in a vertical plane toward and away from the longitudinal axis of the cylindrical shell of a heat exchanger with which the tube bundle extractor is aligned.

A pin 82 is rotatably mounted in the free end of the arm 70 and correspondingly a pin 84 is rotatably mounted in the free end of arm 72. The portions of the connector assembly supported by these pins are similar in structure except for a reverse arrangement of some of the parts to make one applicable to the right side and the other to the left side of the connector apparatus, and the same reference numeral will be used for corresponding parts.

Each pin 82 and 84 has rigidly affixed to it a respective element 86 which is in alignment with the longitudinal axis of the tube bundle extractor and projects axially outwardly from the extractor towards the shell of the heat exchanger. Each element 86 supports a respective transverse pin 88 upon which is pivotally mounted a clevis 90 to which is rigidly affixed a respective connector pin 92. The connector pins project axially toward the shell of the heat exchanger. Each connector pin 92 is mounted to swing in a vertical plane about the pivot pin 88.

Each element 86 has rigidly affixed to or integrally formed with it, a projecting portion 94 which extends laterally from it in a radially outwardly direction relative to the axis of its complementary pin 82 and 84. One end of a respective parallel motion linkage 96 is pivotally connected to the projecting portion 94 and the other end of the parallel motion linkage is pivotally connected to a corresponding latterly projecting portion 98 formed on each of the transverse members 78 and 80. The axis of the pivotal connection 100 of the parallel motion linkage is set at the same distance from the center of rotation of pin 82 or 84 as the axis of the pivotal connection 102 of the parallel motion linkage is set from the axis of the pin 74 or 76. The parallel motion link has the same effective length between its pivoted ends as that of its complementary arm 70 or 72. By this construction, the orientation of the pivotally mounted element 86 will be maintained parallel to a plane of symmetry passing vertically through the longitudinal axis of the tube bundle extractor as the arms 70 and 72 are swung toward and away from each other to accommodate heat exchanger shells of various external diameters. Thus the transverse pins 88 will be maintained in coaxial alignment with each other as the arms 70 and 72 are swung toward and away from the plane of symmetry of the tube bundle extractor.

The arms 70 and 72 are operatively connected together by a transverse shaft 104 which has right hand screw threads 106 formed in one end portion and left hand screw threads 108 formed in the other. These screw threads are complementary to mating screw threads in corresponding nuts 110 and 112 which are pivotally mounted as by a pin 114, FIG. 4, on the respective arms 70 and 72. The central portion 116 of the shaft 104 passes through a thrust bearing member 118 which is rigidly secured to the beam 50. Thrust collars 120 and 122 are adjustably secured to the shaft 104 respectively on either side of the bearing 118. These thrust collars and the complementary bearing member 118 are designed to restrain the shaft 104 from moving laterally with respect to the beam 50.

A handwheel 124 is secured to one end of the shaft 104 to enable the shaft to be rotated and operate through the nuts 110 and 112 to swing the arms in synchronism toward or away from each other. A keeper 126 is secured to the end of the shaft opposite to that to which the handwheel is affixed. The keeper limits the outward swing of the arms and prevents the shaft from escaping from the nut 112.

The pivotally mounted pin 114 permits the respective nuts 110 and 112 to rotate in their mountings in the respective arms 70 and 72 to accommodate the changing angle between the arms and the transverse shaft 104. A radial clearance 128 is provided between the central portion 116 of the shaft and the inner periphery of the bearing 118 to permit the shaft to move vertically in the bearing as the shaft is displaced in position as the angle between the arms 70 and 72 changes.

The adjustable thrust collars 120 and 122 enable an initial lateral adjustment to be made of the position of each connector pin 92 to place them precisely equal distances on their respective sides of the plane of symmetry of the tube bundle extractor. Thus, in subsequent operations, when the shaft 104 is rotated to swing the arms 70 and 72 toward or away from each other to accommodate heat exchanger shells of lesser or greater diameter, the connector pins automatically will be in a position to establish the connected end of the tube bundle extractor frame precisely in line with the longitudinal axis of the heat exchanger shell and the extracting or inserting force will be applied symmetrically between the tube bundle extractor and the shell.

In preparing the heat exchanger for having the separable tube bundle removed from its shell, the fixed end tube sheet is unbolted from the shell flange 130 and plates 132 and 134 are bolted to the flange face. These plates are similar to each other in construction except for a reverse arrangement of parts to make one applicable to the right side and the other to the left side of the shell flange of the heat exchanger and the same reference numeral will be used for corresponding parts of each.

Each connector plate has an arcuate form 136 on its inner edge which is proportioned to overlap a portion of the shell flange 130. A plurality of studs 138 are secured to the connector plate and extend from one face of it in alignment with and to be received by the existing bolt holes 140 in the shell flange 130. Thus the connector plates may readily be detachably secured to the shell of the heat exchanger by inserting the studs in the existing holes and applying the nuts 142 to bolt the connector plates securely to the flange.

As illustrated in FIG. 3, connector plates of appropriate dimensions are made for each size of shell to be worked upon. Thus the connector plates 132 and 134 are proportioned to fit a shell of larger diameter and the connector plates 144 and 146, indicated by phantom lines, are proportioned to fit a shell of lesser diameter. Except for the difference in size and corresponding difference in curvature, the form and disposition of the other component parts of the connector plate as described hereinafter, are similar for all connector plates.

A pair of connector plates is applied to the shell flange of a heat exchanger with the respective plates disposed in diametrically opposed relationship preferably, but not necessarily, on the horizontal axis of the shell. As illustrated by the plate 134, FIG. 4, each plate has a radially disposed slot 148 formed in it and opening at the radially outwardly edge on the plate with diverging tapered surfaces 150 which serve to guide the connector pin 92 into the slot. The connector plate has secured to it in a position spaced below the slot 148 a unitary protecting portion 152 which has an upper horizontal plate surface 154 extending both toward the position of the tube bundle extractor and radially outwardly with respect to the shell of the heat exchanger. This plate surface is designed to be contacted by a guide foot 156, which is unitary with and projects downwardly from the element 86 of the connector pin assembly and is disposed to place the axis of the pin 82 and 84 in horizontal alignment with the complementary radial slot 148. Thus, when the arms 70 and 72 of the connector apparatus on the tube bundle extractor are swung inwardly for connection to the shell of the heat exchanger, the extended plate surfaces 154 will contact the guide footings 156 and serve to position and stabilize the inboard end of the tube bundle extractor and assist in positioning the connector pins 92 so that they may be guided into their complementary slots 148 in the connector plates 132 and 134.

When the respective connector pins are in full engagement with the slots in their complementary connector plates, the free end of the connector pins project axially beyond the face 158, FIG. 4, of the connector plates, a sufficient distance to be received in a forked block 160. This block can be slipped over the projecting end of the connector pins in a direction transversely of the radial slot 148 in the respective connector plates. A handle 162 is attached to the block 160 to facilitate this operation.

The outer end of each connector pin 92 is threaded to receive a nut 164 which is held captive on the connector pin by a washer 166 affixed to the outermost end of the pin. The nut 164 is tightened down on the forked block 160 to clamp the connector pin 92 to the corresponding connector plate 132 and 134. This arrangement provides a means for rapidly clamping and unclamping the parts since a few turns of the nut 164 will release the forked block and permit it to be withdrawn from the assemblage. Withdrawal of the block 160 provides sufficient play between the interengaged parts to permit the connector pin 92 to be disengaged from and swung laterally free of the corresponding connector plate. Also, by standardizing the thickness of all the connector plates used, the tube bundle extractor can be connected expeditiously to the shell of any heat exchanger equipped with connector plates since the position in which the nut 164 is placed in detaching the tube bundle extractor from one shell will not have to be changed during the initial stages of its connection to another shell.

Since the connection between the tube bundle extractor and the shell flange of the heat exchanger is being accomplished while the tube bundle extractor is hanging from the hook and load lines of a mobile crane, there is a possibility that some vertical movement of the extractor frame relative to the shell will occur after the connector pins have engaged the slots of the connector plates. The connector device is designed to accommodate this movement freely by mounting each connector pin in a pivoted joint, the transverse pivot pins 88 of which are maintained in coaxial alignment to act as a hinge connection between the tube bundle extractor and the shell of the heat exchanger. This hinge connection also enables the tube bundle extractor frame to be displaced through a vertical angle relative to the shell of the heat exchanger to compensate for the sag in the tube bundle as it is being inserted into or withdrawn from its shell. When the connector pins are clamped firmly to their respective connector plates, this end of the tube bundle extractor is stabilized in position and enables the extractor frame to be kept in proper alignment with the shell of the heat exchanger by manipulating the lines of the mobile crane.

A platform 168 is mounted on a unitary extension 170 of the pin 82 and is maintained in a horizontal plane through the action of the parallel motion linkage 96 acting on the pin 88 as the associated arm 70 is displaced in an arc. The platform may be formed with a hinged portion 172 which can be folded compactly onto the platform 168 when not in use. This arrangement forms a stable platform upon which the operator of the tube bundle extractor can stand in a position where he can observe the interaction of the tube bundle extractor, the shell of the heat exchanger and the tube bundle while he is manipulating the various controls of the apparatus.

Referring now to FIGS. 5 and 7 in conjunction with FIG. 1, as illustrative of some of the details of construction of one embodiment of the invention, the beam 50 passes through a central opening 174 in the upper portion of the carriage 68. In a relaxed condition of the apparatus the carriage is supported on an upper bearing surface 176 of the beam by bearing shoes 178 and 180 which are in sliding contact with the beam. A second pair of bearing shoes 182 and 184 are pivotally mounted on the carriage below the beam 50 on the shaft 186 to swing in a transverse arc relative to the beam. The bearing shoes 182 and 184 are spaced a small distance apart from the lower bearing surface 188 of the beam in this relaxed condition of the apparatus as indicated by the space 190.

A unitary projection 192 extends from the lower part of the carriage 68 and supports a force-exerting mechanism 194 in a position below and parallel to the longitudinal axis of the beam 50. The force-exerting mechanism is positioned to be in approximately coaxial alignment with the longitudinal axis of the shell of the heat exchanger when the tube bundle extractor is connected to the latter in an operating position.

The force-exerting mechanism may comprise a reversible air motor 196, FIG. 7, which is fixed to the carriage extension 192 by a supporting housing 200 rigidly connected to the carriage, and by a horizontal web 202 formed unitary with the carriage extension. The air motor rotates a sleeve 204 to drive an internally threaded nut 206, which is mounted in suitable bearings 208 and 210 supported by the lower portion of the carriage extension 192. Preferably, but not necessarily, the nut 206 is of the ball-bearing type in which a plurality of steel balls 212 circulate in a helical groove, which mates with a similar groove 214 formed in the surface of an internal shaft 216.

Shaft 216 is restrained from rotation by a bar 218, which is disposed in parallel alignment with the axis of the shaft and rigidly connected to the shaft by a braced cross-member 220. The bar passes in sliding contact through aligned openings 222 and 224 in the body of carriage extension 192 which permits the bar and the shaft 216 connected to it to move in a longitudinal direction relative to the beam 50 but prevents rotation of the shaft. Thus, when the reversible air motor 196 is operated, the shaft 216 will move outwardly or inwardly relative to the housing 200 toward or away from the heat exchanger. An axially expandable sleeve 226 is secured between the inboard end of the shaft 216 and the complementary face of the projection 192 to prevent dirt or other deleterious substances from entering the force-exerting mechanism.

The shaft 216 is connected to a tube bundle by a connecting bar 228. This bar may be detachably connected to the shaft 216 by inserting one end of the bar into a collar 230 affixed to the inboard end of the shaft and then passing the bolt 232 through appropriate holes in the collar and in the end of the bar. Preferably, some play is constructed in this connection to permit the bar 228 to tilt through a small angle with respect to the axis of the shaft 216. The other end of the bar 228 is similarly tiltably connected to a collar 234, FIG. 1, formed in a fixture 236 which latter can be bolted to the fixed end sheet of the tube bundle, or can be affixed to the tube bundle by through bolts which extend longitudinally through the tube bundle from the outermost tube sheet 238 to a backing plate at its other end.

When force is applied between the force-exerting mechanism and the tube bundle, the eccentric loading on the carriage 68 causes it to rock on one of its bearing shoes 178 or 180, depending on the direction of the force, to bring the diagonally opposite lower bearing shoe 184 or 182 into contact with the lower bearing surface 188 of the beam 50. The carriage is proportioned so that when a diagonally spaced upper and lower bearing shoe are in contact with the complementary bearing surfaces of the beam, the frictional resistance to sliding movement of the carriage along the beam will be greater than the force exerted on the carriage by the force-exerting mechanism which force tends to slide the carriage along the beam. The appropriate dimensions of the carriage to achieve this result may be approximated from the following equations:

$$Px = 2Ry \quad (1)$$

where:

$P$ is the horizontal component of force exerted by the force-exerting mechanism.
$x$ is the vertical distance between the horizontal component of applied force and the longitudinal axis of the beam.
$R$ is the resultant vertical force applied to a bearing shoe as the result of the eccentric loading on the carriage.
$y$ is the longitudinal distance between the effective center of force applied to a bearing shoe and the center of rotation of the carriage.

$$2Rf = Ps \quad (2)$$

where:

$f$ is the coefficient of friction effective between a bearing shoe and the complementary bearing surface of the beam.
$s$ is a safety factor against slippage.

Solving Equation 2 for R we obtain:

$$R = \frac{Ps}{2f} \quad (3)$$

Substituting Equation 3 in Equation 1, we obtain:

$$Px = \frac{Psy}{f} \quad (4)$$

Solving Equation 4 for $x$, we obtain:

$$x = \frac{sy}{f} \quad (5)$$

In solving for $y$ we obtain:

$$y = \frac{fx}{s} \quad (6)$$

When a tube bundle extractor is constructed, the distance $x$ will be determined primarily by the distance it is necessary to place the force-exerting mechanism below the longitudinal axis of the beam in order to apply a substantially coaxial force on the tube bundle. Hence, with this distance so set, the above equations can be solved to determine the distance the bearing shoes on the carriage must be set apart to achieve the desired self-locking result. For example, assume a tube bundle extractor is constructed to exert a force of 40,000 pounds on a tube bundle and that the force-exerting means is supported on the projection 192 of the carriage 68 a vertical distance 44″ from the longitudinal axis of the beam. Assume also that the coefficient of friction between the bearing shoe of the carriage and the bearing surface of the beam is 0.2 and that a safety factor of 1.1 is selected to assure that the force-exerting mechanism can exert its full force without the carriage slipping. Solving Equation 6 for $y$, we obtain:

$$y = \frac{.2x}{1.1} = 0.182x$$

Solving this equation, we obtain:

$$y = 8''$$

Therefore, for these conditions the effective longitudinal distance between the bearing shoes, which is substantially the length of the carriage along the beam will be $2 \times 8''$ or 16″.

The position of the carriage when a pull is being applied to the tube bundle is illustrated schematically and in a magnified manner in FIG. 14. In actual construction, the lower bearing shoes of the carriage are displaced only slightly from the lower bearing surface of the beam, say in the range of 1/16 to 3/32″, when the mechanism is in the relaxed condition illustrated in FIG. 13. When the eccentric force is applied to the carriage it is displaced in a rocking motion only slightly before the lower bearing shoe 184 contacts the lower surface 188 of the beam and acts with the diagonally opposite upper bearing shoe 178 to clamp the carriage to the beam with sufficient force to prevent the carriage from sliding along the beam as the force is applied to the tube bundle. Hence the tube bundle is moved out of its shell and along the beam. When the tube bundle is being inserted into its shell, the carriage rocks in a direction opposite to that illustrated in FIG. 14 and a similar interaction involving the bearing shoes 180 and 182 occurs.

The force-exerting means is designed to remove the tube bundle from its shell or insert it into its shell with a series of short strokes, and provision is made for automatically releasing the carriage from its clamped position on the beam and setting it in a new clamped position when the force-exerting mechanism has reached the limit of a stroke. Thus, assuming that the tube bundle is being pulled from its shell when the force-exerting mechanism reaches the limit of its retracting stroke, a roller 240 powered by a piston 242 in an air cylinder 244 located in the top of the carriage 68 automatically will be operated to push the roller downwardly against the upper bearing surface 176 of the beam. The force of the roller lifts the carriage until a plurality of spring-loaded rollers, as illustrated by the roller 246, are brought to bear against the lower-bearing surface of the beam at a time before the lower-bearing shoes contact the surface, all as will be explained in more detail hereinafter. At the same time, the direction of rotation of the air motor 196 automatically is reversed and the force-exerting means pushes against the tube bundle rather than exerting a pulling force on it.

Since the carriage is now supported on rollers with the bearing shoes either out of contact with their complementary bearing surfaces on the beam, or with very little pressure on them, the force-exerting means moves the carriage along the beam to a new outboard position further away from the tube bundle. This new position of the carriage is at the opposite limit of the stroke of the force-exerting mechanism and when this position is attained, the air pressure automatically is removed from the cylinder 244 and a spring 248 retracts the roller to lower the upper bearing shoes of the carriage into contact with the upper bearing surface of the beam.

At the same time, the direction of rotation of the air motor 196 automatically again is reversed and the force-exerting means again exerts a pulling force on the tube bundle. The carriage 68 again therefore rocks on the beam and becomes clamped to it and the force-exerting means moves the tube bundle the distance of another stroke along the beam.

This operation is repeated automatically and continuously until the tube bundle is fully extracted from the shell of the heat exchanger.

When it is desired to insert a tube bundle into its shell, the sequence of operation of the roller 240 relative to the direction of stroke of the force-exerting mechanism is reversed so that this support roller is powered into contact with the upper surface of the beam when the force-exerting mechanism is exerting a pulling force on the tube bundle. The roller is retracted and the upper bearing shoes of the carriage are placed in contact with the beam when the force-exerting mechanism is exerting a pushing force.

The condition of the carriage 68 when the roller 240 is powered against the upper surface 176 of the beam is illustrated schematically in FIG. 12. The condition of the carriage when the roller 240 is retracted and before the force-exerting means is exerting its eccentric force on the carriage is illustrated schematically in FIG. 13. The condition of the carriage when it is clamped to the beam under the effect of a pulling force on the tube bundle of the force-exerting mechanism is illustrated schematically in FIG. 14.

In the illustrated embodiment of the invention, three spring-loaded rollers 246, 250 and 252, FIG. 10, are secured to the upper surface of the horizontal web 202 of the carriage 68. Two of the rollers 250 and 252 are placed on the inboard end of the web, that is, on the end toward the tube bundle, and the third roller 246 is placed on the outboard end of the web. This positioning of two rollers in a location where the carriage tends to be more loaded, supplies lateral stability to the carriage and prevents it from tilting transversely of the beam while it is being moved to a new clamping position.

As illustrated in FIG. 11 wherein the roller 246 is illustrated by way of example, each of the rollers 246, 250 and 252 is loaded with a spring 254 which acts against a stop 256 securely fixed to the shaft 258 so that the roller may be pressed inwardly with respect to the housing 260 but is limited in the distance that it can be displaced outwardly with respect to the housing. The parts are constructed to cause the lower rollers, as 246, to come into contact with the lower bearing surface 188 of the beam prior to the time the lower bearing shoes 182 and 184 contact this surface.

The upper roller 240 is loaded with the spring 248 which causes it to be retracted away from the upper bearing surface 176 of the beam when air pressure is not applied to the cylinder 244. However, the parts are proportioned to permit the air pressure to overpower the spring and project the roller 240 from its housing and into contact with the upper bearing surface of the beam. A shouldered stop 262 is provided on the shaft 268 of the roller to prevent this roller from lifting the carriage high enough to cause the lower bearing shoes 182 and 184 to contact the beam. Thus, when air pressure is directed into the cylinder 244, the carriage will be stably supported entirely by the four rollers. It will be noted that the air cylinder 244 is displaced from the center of the carriage toward the position of the center of gravity of the carriage, so that the carriage will be lifted vertically without rocking or tilting relative to the beam when air pressure is applied to the cylinder.

Figure 15:
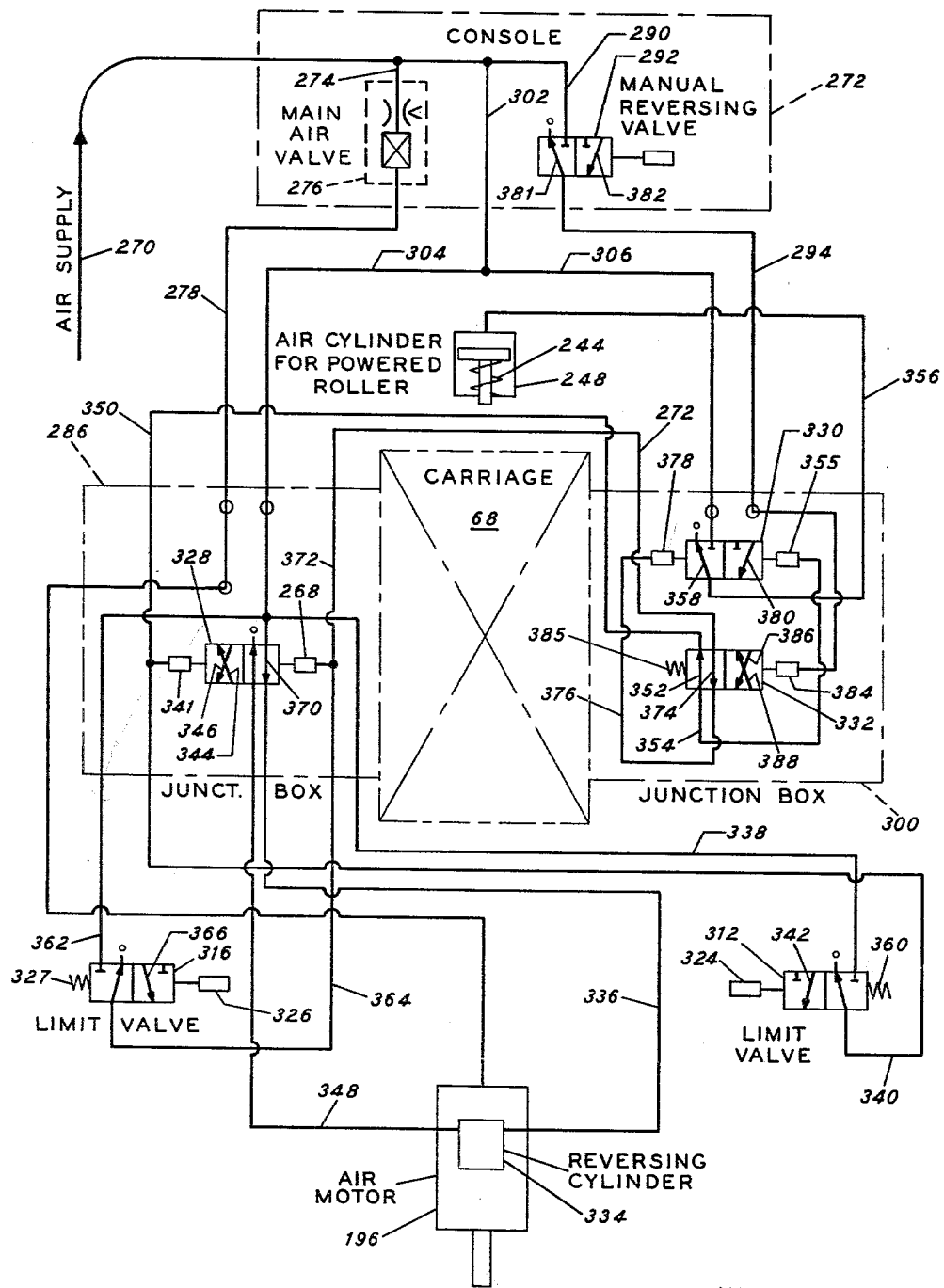
FIG. 15 is a schematic illustration of an air circuit for operating the embodiment of the tube bundle extractor illustrated in the previous figures.

FIG. 15 is a schematic illustration of an air circuit which may be used to operate the tube bundle extractor in the manner described heretofore. The tube bundle extractor is connected to a source of compressed air through the conduit 270 which is connected to a control console 272, FIG. 2, mounted on the inboard or connector end of the tube bundle extractor frame in a position conveniently available to the operator so that he may control the device while observing its operation relative to the tube bundle and the shell. A branch line 274 connects the conduit 270 to the main air control valve 276 which regulates the flow of air to the air motor 196 through the conduit 278.

Preferably, the conduit 278, as will be the case with other conduits to be described subsequently, passes from the valve 276 longitudinally through the interior of the beam 50 and thence through a rotary coupling 280 to a reel 282 which is mounted on the outboard portion of the frame of the tube bundle extractor, as seen in FIGS. 1 and 2. A flexible hose 284 is wound on the reel and conducts the air to a connecting means within the box 286, mounted on the side of carriage 68, where the flexible hose is connected to the exterior conduit 288 which leads to the air motor 196. The reel 282 is spring-loaded and permits the flexible hose 284 to be reeled and unreeled to accommodate the changing position of the carriage 68 as it moves along the beam 50.

A second branch conduit 290 leads from the air supply conduit 270 to a second valve 292 on the console 272. This valve establishes the sequence of operations of the roller 240 with respect to the direction of movement of the carriage 68 for the purpose explained heretofore and in a manner to be described hereinafter. The valve 292 is connected by a conduit 294, which passes through the center of the beam, with a flexible hose 296 on the reel 298, and the flexible hose conducts the air to a connector within the junction box 300 which is mounted on the side of the carriage 68.

A third branch conduit 302 connects the air supply conduit 270 directly with two conduits 304 and 306 which pass through the center of the beam and are connected through flexible hoses 308 and 310 on the respective reels 282 and 298 with connectors in the respective junction boxes 286 and 300.

Referring now particularly to FIG. 7 in conjunction with FIG. 15, a limit valve 312 is mounted on the housing 200 of the force-exerting mechanism in a position to be actuated by a cam plate 314 affixed to the end of the rod 218 when the threaded shaft 216 is retracted the full extent of its stroke. A second limit valve 316 is rigidly mounted on a bracket 318 secured to the web 320 of the carriage structure and is positioned to be engaged by the camming block 322 affixed to the rod 218 when the threaded shaft 216 extends from the force-exerting mechanism the full extent of its stroke. The camming block 322 passes through a channel 323 in the body of the carriage projection 192 as the rod 218 moves longitudinally relative to the carriage.

Limit valves 312 and 316 are spring-loaded and normally assume the position shown in FIG. 7. However, when the pin 324 or the pin 326 of the respective valves 312 and 316 is depressed against the spring load, the valve operates to change the direction of flow of air in a portion of the circuit, as will be described hereinafter.

The junction box 286 on the carriage 68 contains an air pilot-operated valve 328, and the junction box 300 on the carriage contains an air pilot-operated valve 330 and also an air pilot-operated, spring-return valve 332. An air-actuated rotary type reversing cylinder 334 is connected to the internal direction control valves of the air motor to determine the direction of motor rotation, in a manner known to the art.

The positions of the elements of the air circuit illustrated in FIG. 15 indicate that the carriage 68 is frictionally clamped to the beam 50, and the force-exerting mechanism is pulling the tube bundle out of its shell. The cylinder 244 is vented to atmosphere and the roller 240 is retracted. Air passes from the air-supply conduit 270 through the branch conduit 302 and conduit 304 and through the port 370 in valve 328 and through conduit 336 to one side of the reversing cylinder 334 on the air motor and is exhausted to atmosphere from the other side of the reversing cylinder through the conduit 348 and the valve 328.

During a power extracting movement, when the force-exerting mechanism reaches the end of its stroke the contact pin 324 of valve 312 is depressed, and the air conduit 338, which receives its air from conduit 304, is placed in communication with the conduit 340 through the valve port 342. The air pressure in conduit 340 operates the pilot actuator 341 of valve 328 and shifts the valve 328 to the right as viewed in FIG. 15 to place the valve ports 344 and 346 in communication respectively with the conduits 336 and 348 and changes the direction of air flow in these conduits to operate the reversing cylinder 334, thus reversing the direction of rotation of the air motor 196.

The conduit 340 is connected to the conduit 350 which continues through the circuit and communicates with port 352 in the valve 332 located in junction box 300. This port directs the air from conduit 350 into conduit 354 which is connected to the pilot operator 355 of the valve 330. Air pressure in the conduit 354 shifts the valve 330 to the left with respect to the diagram of FIG. 15 and places the conduit 306 in communication with the conduit 356 through the valve port 358. Conduit 306 receives air from the supply conduit 270 through the branch conduit 302, and this air is directed to the air cylinder 244 to force the roller 240 into contact with the upper bearing surface of the beam 50. The carriage is now supported on its rollers, and since the direction of rotation of the air motor 196 has been reversed, the force-exerting mechanism is pushing against the tube bundle. The resistance to movement along the beam 50 of the roller supported carriage is less than the resistance to movement of the tube bundle relative to its shell and therefore the carriage 68 is moved along the beam 50.

As the carriage moves away from contact with the actuating pin 324 of valve 312, the spring 360 forces the valve to the position indicated in FIG. 15. Therefore, air pressure is cut off from the conduit 340, and the latter is vented to atmosphere. This does not change the positions of valves 328 and 330, since they require properly directed compressed air to shift them in either direction.

When the carriage 68 is moved along the beam to the limit of stroke of the shaft 216, the camming block 322 contacts the pin 326 on the limit valve 316 and shifts the valve against the spring 327, and to the left with respect to the position of the valve shown in FIG. 15. This places the conduit 362 in communication with the conduit 364 through the valve port 366. Conduit 362 receives an air supply from the conduit 304 and this air is directed to the pilot actuator 368 for valve 328 to shift it to the position indicated in FIG. 15 of the drawings. Air now passes from the conduit 304 through the port 370 of valve 328 and thence through the conduit 336 to the reversing cylinder 334 of air motor 196 to reverse the direction of rotation of the motor.

The air from the conduit 364 passes also through the conduit 372 to the valve 332 and thence through the port 374 to the conduit 376. Conduit 376 is connected to the pilot operator 378 for valve 330 and hence the valve is shifted to the position indicated in FIG. 15 of the drawings. The air supply is now cut off from the air cylinder 244 and this cylinder is vented to the atmosphere through the conduit 356 and the valve port 380. Therefore, spring 248 retracts the roller 240 from contact with the upper bearing surface of the beam 50. Since the force-exerting mechanism is now exerting a pull on the tube bundle, and since the rollers of the carriage are no longer in contact with the beam 50, the carriage is rocked on the beam and frictionally clamps to it in the manner described heretofore, and the force-exerting mechanism pulls the tube bundle the length of another stroke from its shell.

The above-described sequence of operations is repeated automatically until the tube bundle is fully extracted from its shell, at which time the supply of air to the air motor is cut off by manually operating the valve 276 and the operation of the mechanism is stopped.

When it is desired to insert a tube bundle into its shell rather than extract it from it, it is necessary to reverse a sequence of operation of the powered roller 240 with respect to the direction of rotation of the air motor. This is accomplished by actuating the manually controlled valve 292 to shift the valve from the position when it is venting conduit 294 to the atmosphere through port 381 and to place the air supply through the conduit 290 in comunication with the conduit 294 through the valve port 382. The conduit 294 communicates with the pilot operator 384 for valve 332 and shifts the valve 332 against the spring 385 and to the left with respect to the position of the valve shown in FIG. 15 to place the valve port 386 in communication between the conduit 372 and the conduit 354, and to place the valve port 388 in communication with the conduit 350 and the conduit 376. The flow of air to the pilot operators 355 and 378 for valve 330 is thereby reversed from that previously described and hence the operation of this valve is reversed with respect to the operation of the limit valves 312 and 316. Thus, air will be introduced into the cylinder 244 when the limit valve 316 is contacted and the roller 240 will be powered into contact with the upper bearing surface of the beam 50 to permit the carriage to be moved along the beam in a direction toward the shell of the heat exchanger. Under these circumstances, when the limit valve 312 is contacted, the roller 240 will be retracted and the carriage will clamp to the beam in its new position to enable the force-exerting mechanism to exert another pushing stroke on the tube bundle. As in the operation described previously, the device will operate automatically to push the tube bundle within its shell with short strokes until it is completely inserted within the shell, at which time the air supply to the air motor is manually cut off at the valve 276.

It is within the concept of this invention to invert the locations of the rollers as described heretofore and place the power-operated roller to engage the bottom surface of the beam and to pull the carriage down into contact with the beam against the action of spring-loaded rollers which engage the top bearing surface of the beam.

As stated heretofore, the tube bundle is made up of individual tubes of small diameter which are quite flexible. As the tube bundle is extracted from the shell of the heat exchanger, it will tend to bend and sag and some means must be provided to support it along its length to prevent it from being damaged. To this end a plurality of slings are provided which are connected to carriages supported by rollers on the beam 50. Desirably, some adjusting means should be provided to enable the alignment of a portion of the tube bundle relative to the axis of the beam 50 to be adjusted as the changing conditions of weight and sag of the tube bundle displace it from alignment as it is being extracted from or inserted into the shell of the heat exchanger.

Figure 16:
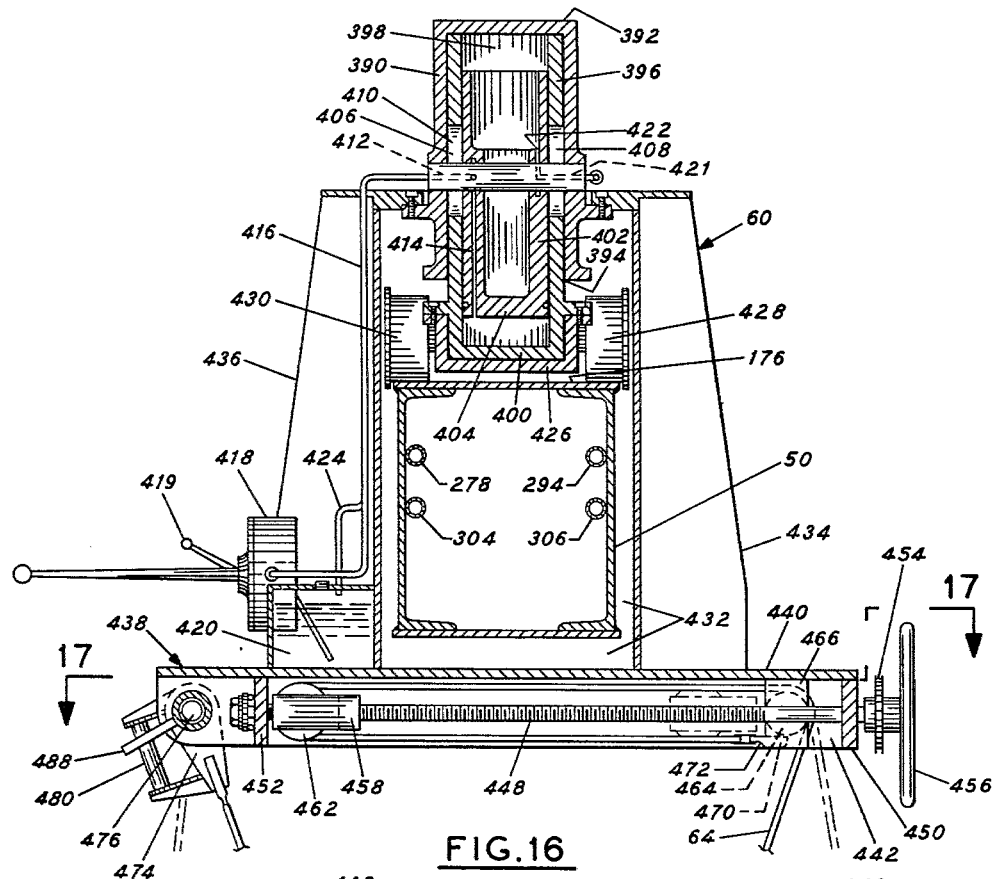
FIG. 16 illustrates in end elevation and partly in section a portion of a sling assembly employed with the tube bundle extractor.
Figure 17:
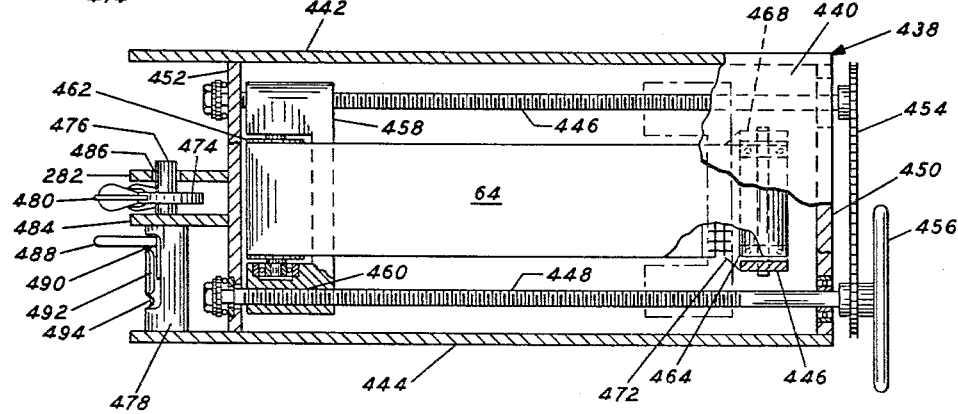
FIG. 17 is a plan view of a portion of the sling assembly taken along the line 17—17 of FIG. 16.

Referring now to FIGS. 16 and 17 in conjunction with FIG. 1, the sling apparatus comprises a carriage 60, to the top of which is rigidly connected a vertically disposed cylinder 390 which has a closed top end 392 and an open bottom end 394. A cylindrical sleeve 396 having an open top end 398 and a closed bottom end 400 is slidably mounted within the cylinder 390. A piston 402 slidably mounted within the cylindrical sleeve 396 with the head 404 of the pistons disposed at the bottom end thereof. A stationary pin 406 passes diametrically through this assemblage and is affixed to the cylinder 390 and to the piston 402. The pin passes through diametrically opposed slots 408 and 410 formed through the walls of the cylindrical sleeve 396 to permit the sleeve to reciprocate vertically relative to the pin 406 and the cylinder 390.

The pin 406 has an axial passageway 412 formed part way through it and communicating with a passageway 414 formed in the wall of the piston and opening through the head of the piston. The passageway 412 is connected through a conduit 416 with a manually operated hydraulic pump 418 which receives its supply of hydraulic fluid from the sump 420 on the carriage frame. A second axial passage 421 formed part way through the opposite end of the pin 406 communicates through a second passageway 422 in the wall of the piston 402 with the inner upper end of the cylindrical assembly. This passageway 421 in the pin 406 is connected through the conduit 424 with the upper portion of the sump 420 and provides a closed system for circulating air from the upper portion of the sump into the inner upper portion of the cylinder 390.

The lower portion of the cylindrical sleeve 396 has bolted to it a frame 426 which extends transversely of the beam 50 and carries a plurality of rollers, as represented by the rollers 428 and 430, which are disposed to contact respectively each transverse side of the upper bearing surface 176 of the beam. It will be apparent that when hydraulic fluid is forced into the inside of the lower end of the cylindrical sleeve 396 the frame of the sling carriage 60 will be elevated relative to the beam. Likewise, when hydraulic fluid is released from the lower end of the cylindrical sleeve 396, the frame of the sling carriage 60 will be lowered in elevation relative to the beam 50. A pressure release valve built into the pump system is manually operated by handle 419 to permit a controlled lowering of the sling. The sling carriage is made with a central opening 432 of sufficient vertical extent to accommodate this adjustment of the carriage relative to the beam.

The side members 434 and 436 of the sling carriage support a transversely disposed portion 438 of the frame below and spaced apart from the beam 50. This portion of the frame comprises a horizontal plate member 440 to the lower surface of which is secured two parallel side members 442 and 444 which extend transversely of the beam 50. A pair of parallel screw threaded shafts 446 and 448 are supported below the plate 440 and within the side members 442 and 444 by transverse members 450 and 452 through which the shafts pass in appropriate rotary bearings. The shafts are connected together at one end by a chain drive 454 which cooperates with a handwheel 456 to cause the shafts to be rotated manually in synchronism. A roller support 458 bridges the shafts 446 and 448 and receives each shaft in a complementary screw-threaded opening 460. Thus the roller support 458 will travel along the threaded shafts as they are rotated.

The roller support 458 carries an idle roller 462 which is supported by anti-friction bearings and disposed transversely of the threaded shafts 446 and 448. A second bearing mounted guide roller 464 is supported from the underside of the plate 440 in a fixed position adjacent the transverse member 450 by the brackets 466 and 468. A transverse member 470 extends between these brackets and has a horizontal lip 472 projecting from it toward the position of the roller 464. The lip 472 is placed below the axes of the shafts 446 and 448 and is vertically spaced apart from them a distance sufficient to clear the roller support 458 when it travels on the threaded shafts to the location of the lip.

One end of a flexible sling 64 is secured to the lip 472 which holds it relatively stationary in position. The sling is disposed parallel to the threaded shafts 446 and 448 and displaced over the roller 462 and thence in parallel alignment with itself back across the frame and over the roller 464. The free end of the sling has an eye 474 secured to it to receive a pin 476 which is slidably mounted in the barrel 478 secured to the frame adjacent the transverse member 452. A handle 480 secured to the eye 474 assists in manipulating the eye into a position between the projecting webs 482 and 484 secured to the transverse member 452 and into alignment with an opening 486 in web 482 and with the pin 476. The pin is projected through the eye by means of the operating lever 488 attached to it, and the lever is placed in a detent 490 formed in the slot 492 through the wall of the barrel 478 to hold the pin in its projected position. The pin may be retracted from the eye by moving the lever 488 to the other end of the slot 492 and may be restrained in a retracted position by engaging the lever 488 with the detent 494.

When the sling mechanism is employed to support a tube bundle, the handwheel 456 is operated to provide enough slack in the sling 64 to permit the sling to be passed around the bottom of the tube bundle so that the eye 474 may be engaged by the pin 476. The handwheel 456 is then operated to move the roller support 458 along the threaded shafts 446 and 448 until the slack is adjusted out of the sling and the sling snugly engages the bottom of the tube bundle. The threaded shafts are constructed to remain stationary when a back drive is placed on them by the weight of the tube bundle acting through the roller carriage 458.

In the initial operation of extracting a tube bundle from the shell of a heat exchanger and with the frame of the tube bundle extractor parallel to the axis of the shell, the above described adjustment to the sling augmented by the use of the hydraulic jacking cylinder 396, described above, holds the supported portion of the tube bundle a constant distance below the longitudinal axis of the beam 50 as the tube bundle is pulled along the beam.

Ordinarily, two trolley slings are provided; one to support the front portion of the tube bundle and the other to suport the rear portion. As explained heretofore, the flexible tube bundle will sag between the supporting slings. An adjustment can be made for this sag by using the load lines of the derrick to raise the outboard end of the extractor frame while the frame hinges about the aligned pins 88 on the connector mechanism as explained heretofore. However, when inserting the tube handle into its shell, the operation can be performed more expeditiously and with less danger of damaging the tube sheets or the tubes themselves, when provision is made to adjust the vertical position of the tube bundle relative to the extractor frame close to the position where the tube bundle is entering its shell, so that the effect of the sag at this location can be compensated for to prevent a tube sheet from hanging up on the end surface of the heat exchanger shell flange. As described hereinbefore, such an adjustment is made by operating the hydraulic pump 418 on the sling carriage to raise or lower the tube bundle as required. It will be apparent that the position of the sling closest to the shell of the heat exchanger can be changed from time to time to provide a new point of support for the tube bundle and to permit the adjustment of the elevation of the tube bundle relative to the beam 50 to be made at the most effective location.

FIGS. 18 to 24 inclusive illustrate another modification of a drive means for the force-exerting carriage used on a tube bundle extractor in which a single beam is employed as the principal frame member. In this modification, the beam member 500 corresponds to the beam 50 illustrated in FIG. 1 and the carriage 502 corresponds to the previously illustrated carriage 68.

A reversible air motor 504 is secured to the outboard end of the beam and is operatively connected to a threaded shaft 506 which extends substantially the entire length of the beam 500. The shaft is supported at its outboard end, that is, the end adjacent to the air motor, in a compound bearing 508 which includes both a radial bearing 510 and a thrust bearing 512, FIG. 21. The inboard end of the shaft, that is the end toward the shell of the heat exchanger, is supported in a bearing 514 which includes a radial bearing 516 and a thrust bearing 518.

The beam 500 passes through a central opening 520 in the carriage 502 and the carriage is supported on the beam by rollers, which contact both the upper and lower bearing surfaces of the beam. Thus, as illustrated in FIGS. 18 and 19, a roller represented by the roller 522 is positioned at each of the four corners of the upper portion of the carriage to contact the corresponding edge of the upper bearing surface 524 of the beam. Likewise, a roller as represented by the roller 526 is positioned at each of the four corners of the lower portion of the carriage to contact the corresponding edge of the lower bearing surface 528 of the beam. The carriage has a unitary projecting portion 530 extending downwardly from it and a force-exerting bar 532 is pivotally connected to the lower part of this projection. The bar is positioned below the longitudinal axis of the beam 500, a distance approximately equal to the distance between the longitudinal axis of the shell of the heat exchanger and the longitudinal axis of the beam 500 when the tube bundle extractor is connected to the heat exchanger shell.

The carriage 500 is formed with a second unitary projecting portion 534 which extends upwardly through a longitudinal channel 536 in the beam to a central location within the carriage and suports a nut 538 in axial alignment with the threaded shaft 506 which shaft engages the nut. Thus, when the shaft 506 is rotated, the interaction between the shaft and the nut 538 will drive the carriage along the length of the beam 500.

Preferably the nut 538 is of the recycled ball bearing type previously described with respect to FIG. 7 and is supported at both ends in a spherical seat, as indicated by the numeral 539, FIG. 24. This mounting permits the nut to move in its support to follow irregularities of alignment of the shaft 506. The nut is prevented from rotating by a set screw 541 inserted through the wall of the supporting projecting portion 534 and loosely engaging a recess 543 in the outer wall of the nut.

The shaft 506 may be 20 feet or more in length and it is desirable to provide a support intermediate its ends to prevent the shaft from sagging. As shown in FIGS. 22 and 23, this support may comprise a lever 540 which projects into the interior of the beam 500 at the midpoint of the shaft and on which is mounted the supporting rollers 542 which engage the bottom portion of the shaft to suport it while permitting the shaft to rotate. The lever is secured to a vertical shaft 544 which is rotatably mounted in bearings 546 and 548 at one side of the beam structure. A torsion spring 550 is connected between the shaft 544 and a stationary anchor to hold the lever 540 normally in a position extending transversely into the beam to support the shaft 506. However, the spring permits the lever to be swung clear of the projection 534 when the nut 538 traverses this portion of the shaft. An elongated cam 552 is secured to the projection 534 below the nut 538 and is positioned to engage the lever 540 as the projection approaches it from either direction and to hold the lever clear of the projection as the nut traverses this portion of the shaft.

The nut 538 will relieve the pressure of the shaft from the rollers 542 as it approaches the central portion of the shaft to permit the lever to swing clear of the shaft without interference. As the cam 552 passes the position of the lever, the spring 550 swings the lever back under the shaft, and the weight of the deflecting shaft again is placed on the bearings 542 as the nut is traversed further along the shaft.

An adjustable collar 554, FIG. 21, is screw threaded on the shaft 506 at its outboard end to transmit the axial load on the shaft to the thrust bearing 512 when the tube bundle is being extracted from its shell. A heavy washer 556, FIG. 20, is secured to the inboard end of the shaft to transmit its axial load to the thrust bearing 518 when the tube bundle is being inserted into its shell. The thrust bearings 512 and 518 are designed to permit some movement of the shaft in an axial direction to accommodate stretch or other axial displacement of the shaft as the working load is placed on the carriage 502. Thus the forces acting on the long shaft member 506 are always tension forces regardless of the direction of movement of the tube bundle.

In this modification of the invention, the rollers supporting the carriage 502 on the beam 500, as represented by the rollers 522 and 526, are constructed and arranged to be in snug contact with the complementary bearing surfaces of the beam and to maintain this relationship to prevent binding of the carriage on the beam while the tube bundle is being pulled from or pushed into its shell. The threaded shaft 506 drives the carriage 502 along the beam 500 continuously the full length of the stroke required to extract or insert the tube bundle.

It will be understood that in this modification of the invention adjustable slings as described heretofore, will be used to support and adjust the position of the tube bundle relative to the beam 500 and the shell of the heat exchanger as the tube bundle is moved along the beam.

It is apparent from the foregoing description that the apparatus of this invention fulfills the objects for which it was designed. Other modifications than those described herein may be made to the apparatus of this invention without departing from the inventive concept. Therefore, it is intended that the invention embrace all equivalents within the scope of the appended claims.

I claim:

1. Apparatus for extracting a separable tube bundle from and inserting a tube bundle into the shell of a heat exchanger comprising a frame including a single principal beam disposed longitudinally thereof, connector means for connecting said frame pivotally at one end to a shell of a heat exchanger, adjustable means for supporting said frame to dispose said beam in parallel relationship with and spaced above the longitudinal axis of said shell and for adjusting said frame pivotally in a vertical plane about said connector means when said frame is connected to said shell, a carriage mounted on said beam and movable along said beam, means for connecting said carriage to a separable tube bundle within said shell, force-exerting means carried by said apparatus for exerting a force between said carriage and said tube bundle to extract said tube bundle from and insert said tube bundle into said shell, and a plurality of sling means supported by and movable along said beam to support said tube bundle in alignment with said beam as said bundle is extracted from and inserted into said shell.

2. Apparatus in accordance with claim 1 wherein the separate sling means of said plurality of sling means are supported by respective carriages which are movable along said beam, and wherein said carriages have portions thereof which are individually vertically adjustable relative to said beam, and wherein the vertical position of said tube bundle relative to said beam can be adjusted by the adjustment of said portions of said carriages.

3. A tube bundle extractor comprising an elongated frame including means forming a trolley beam integral therewith, means for supporting said frame to align said trolley beam in parallel alignment with and above the longitudinal axis of a shell containing a separable tube bundle, means for connecting one end of said frame to said shell, a carriage slidably mounted on said trolley beam, a force-exerting means supported by said carriage and positioned below the longitudinal axis of said trolley beam substantially in coaxial alignment with the longitudinal axis of said tube bundle, means for connecting said force-exerting means to said tube bundle to exert an axially directed force on said tube bundle substantially at the longitudinal axis thereof, and means preventing movement of said carriage along said trolley beam when said force-exerting means exerts a force on said tube bundle to force said tube bundle into and out of said shell.

4. A tube bundle extractor in accordance with claim 3 wherein said force-exerting means operates on said carriage when applying an axially directed force above a predetermined amount to said tube bundle and causes said carriage to rock and to bind against and engage said trolley beam with sufficient frictional force to prevent longitudinal movement of said carriage relative to said trolley beam.

5. A tube bundle extractor in accordance with claim 4 wherein said carriage is proportioned substantially in accordance with the relationship $$y = \frac{fx}{s}$$

where:

$y$ is the longitudinal distance between the effective center of frictional force acting at one end of said carriage when said carriage rocks and engages said trolley beam and the center of the rocking rotation of said carriage.

$f$ is the coefficient of friction effective between the said one end of said carriage and the complementary surface of the said trolley beam which it engages.

$s$ is a safety factor against slippage of said carriage along said trolley beam.

$x$ is the vertical distance between the horizontal component of applied force of said force-exerting means and the longitudinal axis of said trolley beam.

6. In a tube bundle extractor wherein a longitudinal frame is used which is secured at one end to the shell of a heat exchanger containing a separable tube bundle and extends axially relative thereto and wherein a force-exerting means is connected between the said frame and a tube bundle within the said shell to exert a force between the said frame and the said tube bundle to move the said tube bundle relative to its said shell and along said frame while supporting said tube bundle by sling means supported from the said frame, the improvement which comprises a trolley beam integral with a longitudinal frame and extending in parallel alignment with the axis of a shell of a tube bundle, means for securing one end of said frame to said shell to prevent relative longitudinal movement between said trolley beam and said shell, a carriage mounted on said trolley beam in movable relationship longitudinally thereof, a force-exerting means supported by said carriage and positioned below said trolley beam in spaced-apart relationship thereto, means for connecting said force-exerting means to said tube bundle to exert a force substantially at and along the longitudinal axis of said tube bundle, and means actuated by said force-exerting means to prevent movement of said carriage along said trolley beam when said force-exerting means exerts force to move said tube bundle relative to said shell.

7. A tube bundle extractor in accordance with claim 6 wherein said force-exerting means applies an eccentric force to said carriage when said force-exerting means is exerting a force to move said tube bundle relative to said shell, and wherein said eccentric force rocks said carriage on said trolley beam and said carriage is proportioned to contact the surface of said trolley beam with increased frictional force as said carriage is rocked and to clamp to said trolley beam in a relatively stationary position while said force-exerting means moves said tube bundle relative to said shell.

8. A tube bundle extractor wherein a longitudinal frame is used which is secured at one end to the shell of a heat exchanger containing a separable tube bundle and extends axially relative thereto and wherein a force-exerting means is connected between the said frame and the tube bundle within the said shell to exert a force between the said frame and the said tube bundle to move the said tube bundle relative to its shell and along said frame while supporting said tube bundle by sling means supported from said frame, the improvement which comprises a trolley beam integral with a longitudinal frame and extending in parallel alignment with the axis of a shell of the tube bundle, means for securing one end of said frame to said shell to prevent relative longitudinal movement between said trolley beam and said shell, a carriage mounted on said trolley beam in movable relationship longitudinally thereof, means supported by said carriage and positioned below said trolley beam and connecting said carriage to said tube bundle, and a force-exerting means carried by said tube bundle extractor and connected to and between said trolley beam and said carriage to exert a force to move said carriage and the said tube bundle relative to said shell to force said tube bundle into and out of said shell.

9. A tube bundle extractor comprising a beam having top and bottom bearing surfaces, a carriage mounted on said beam for movement along said beam, a first bearing surface on said carriage in slidable engagement with one of said surfaces of said beam, a second bearing surface on said carriage complementary to and having an idle position in spaced apart relationship from the other of said bearing surfaces of said beam, an adjustable first roller means secured to said carriage and positioned to be extended to bear against said one bearing surface of said beam to displace said first bearing surface of said carriage from engagement with said one bearing surface of said beam and to be retracted, means to selectively extend and retract said roller means, adjustable second roller means on said carriage and positioned to bear against said other bearing surface of said beam when said first roller means is extended into contact with said one bearing surface of said beam, a force-exerting means for connecting said carriage to a separable tube bundle to exert a force on and between said carriage and said tube bundle in a direction substantially parallel to said beam and laterally displaced from the longitudinal axis thereof, said force-exerting means operating to move said carriage along said beam when said first roller means is extended into contact with said one surface of said beam and said force-exerting means operating to rock said carriage relative to said beam to engage in frictional contact said first and said second bearing surfaces of said carriage with the complementary said top and said bottom bearing surfaces of said beam when said first roller means is retracted.

10. A tube bundle extractor comprising a beam having a top and a bottom elongated plane bearing surface, a carriage mounted on said beam for selective movement therealong, an upper bearing surface on said carriage in slidable engagement with said top bearing surface of said beam, a lower bearing surface on said carriage complementary to and having an idle position in spaced-apart relationship from said bottom bearing surface of said beam, an adjustable top roller means secured in the top of said carriage and positioned to be extended to bear against said top bearing surface of said beam to lift said carriage relative to said beam to reduce the frictional contact between said top bearing surface of said beam and said upper bearing surface of said carriage and to be retracted, means to selectively extend and retract said top roller, spring-loaded bottom rollers on said carriage and positioned to bear against said bottom bearing surface of said beam when said top roller is extended, a force-exerting means connected to said carriage and to a separable tube bundle within a shell to exert a force on and between said carriage and said tube bundle in a direction along said beam and laterally displaced from the longitudinal axis of said beam, said force-exerting means operating to move said carriage along said beam when said top roller is extended, said force-exerting means operating to rock said carriage relative to said beam when said top roller is retracted and to cause said carriage to engage said beam in frictional contact to prevent movement of said carriage relative to said beam by the force exerted by said force-exerting means.

11. In a tube bundle extractor having an elongated frame which is supported in substantially parallel alignment with the axis of a heat exchanger shell containing a separable tube bundle and with connector means for connecting one end of said frame to said shell, the improvement which comprises a transverse member secured to one end of said frame and extending laterally on each side thereof, a pair of arms with a respective arm of said pair pivotally connected at one end to each respective laterally outer end of said transverse member to swing in respective arcs in a first common plane transversely of the longitudinal axis of said frame, a respective hinge pin supported by a respective complementary shaft rotatably mounted on the free end of each said arm with the longitudinal axis of each said hinge pin disposed in a second common plane parallel to said first common plane, means maintaining the said longitudinal axis of one said hinge pin in coaxial alignment with the said longitudinal axis of the other said hinge pin as said arms are swung in equal complementary arcs relative to a plane of symmetry of said frame and passing through said longitudinal axis of said frame, and a respective connector pin pivotally mounted on each said hinge pin and adapted to be secured to said shell on respective opposite sides thereof.

12. A tube bundle extractor in accordance with claim 11 wherein the respective arms of said pair of arms are operatively connected together by means for moving said arms in coordination toward and away from each other while maintaining an equal distance between each said connector pin and said plane of symmetry of said frame.

13. A sling apparatus for use on a tube bundle extractor having a trolley beam comprising, a sling carriage, wheels mounted on said carriage and positioned to engage an upwardly disposed surface of a trolley beam, a vertically disposed cylinder in said carriage, a piston slidably mounted in said cylinder for vertical reciprocation toward and away from said trolley beam, a frame connected to said piston, a flexible sling means connected to said frame, power means for actuating said piston and control means for said power means to selectively raise and lower said piston and said frame and said sling means in relation to said trolley beam.

References Cited by the Examiner
UNITED STATES PATENTS

| | | | |
|---|---|---|---|
| 1,541,424 | 6/25 | Linderme. | |
| 2,279,340 | 4/42 | Postlewaite. | |
| 2,551,897 | 5/51 | Notestein | 254—29 |
| 2,596,340 | 5/52 | Mahns. | |
| 2,681,789 | 6/54 | Nichols | 254—29 |
| 2,695,594 | 11/54 | Fairburn. | |
| 2,991,974 | 7/61 | Bingham | 254—29 |
| 2,994,510 | 8/61 | Michalak | 254—30 |
| 3,031,167 | 4/62 | Roussel | 254—105 |

OTHER REFERENCES

Chemical Engineering (Periodical), vol. 66, No. 1, pp. 72 and 74, Jan. 12, 1959.

HUGO O. SCHULZ, *Primary Examiner*.